J. J. LAUER.
AEROPLANE BALANCING AND CONTROLLING MEANS.
APPLICATION FILED SEPT. 13, 1911.
1,033,710.
Patented July 23, 1912.
2 SHEETS—SHEET 1.
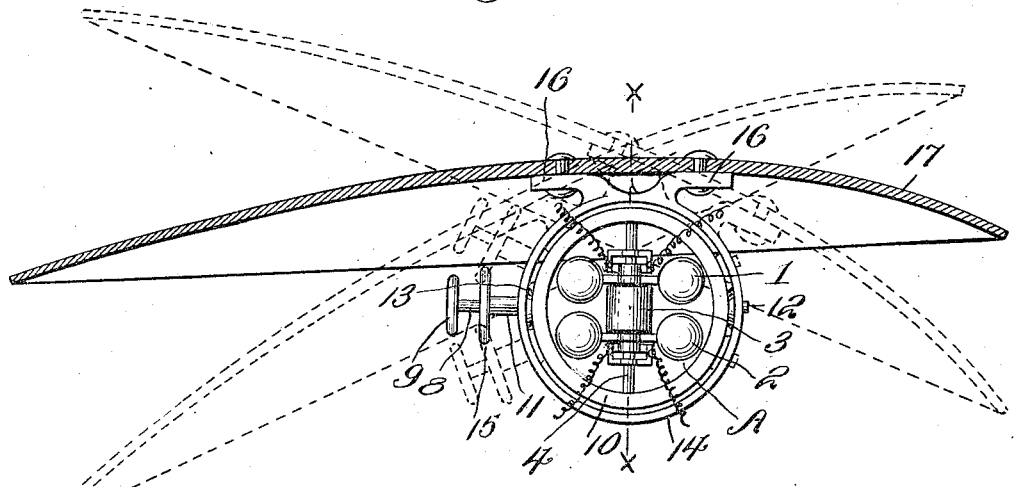
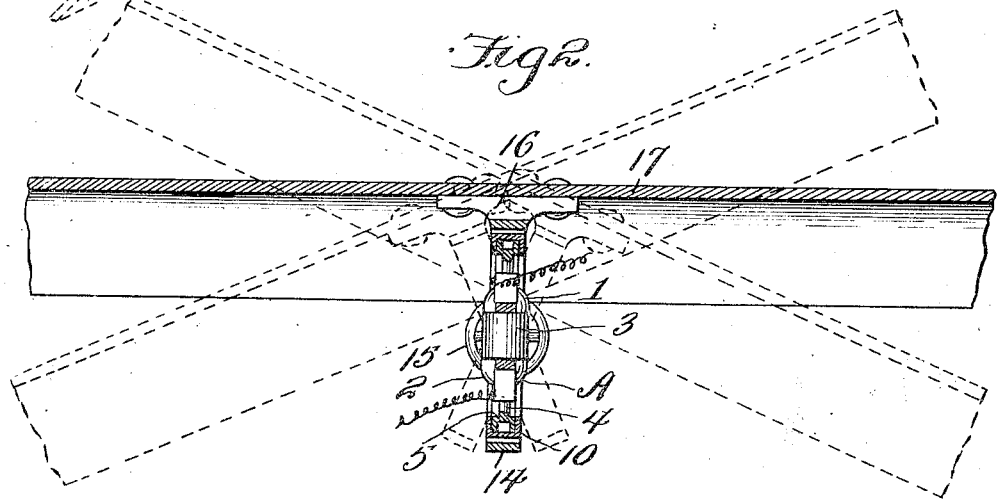
Inventor
John Jay Lauer,
By Victor J. Evans,
Attorney
Witnesses J. J. LAUER.
AEROPLANE BALANCING AND CONTROLLING MEANS.
APPLICATION FILED SEPT. 13, 1911.
1,033,710.
Patented July 23, 1912.
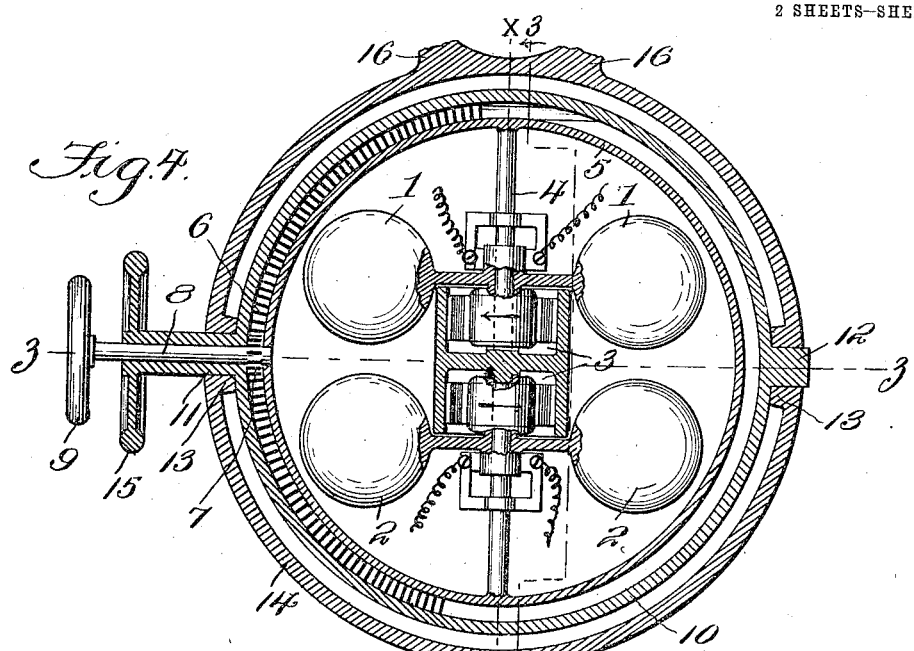
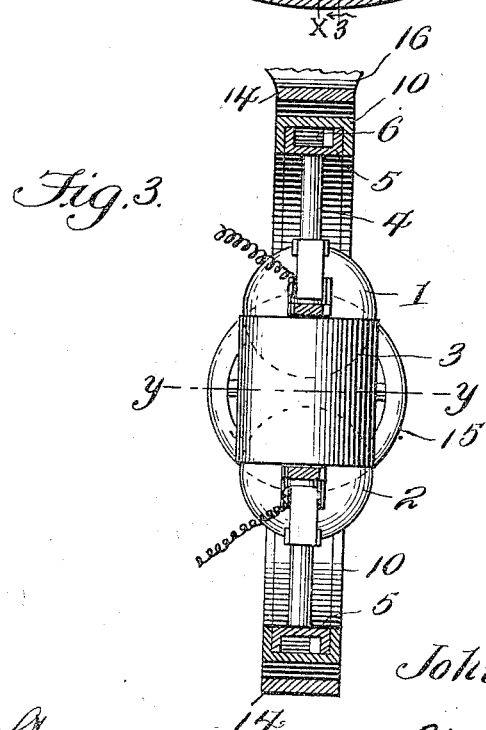
Inventor
John Jay Lauer,
By Victor J. Evans,
Attorney
Witnesses
J. L. Wright.
C. C. Hines.

UNITED STATES PATENT OFFICE.

JOHN J. LAUER, OF ALTURAS, CALIFORNIA.

AEROPLANE BALANCING AND CONTROLLING MEANS.

1,033,710.

Specification of Letters Patent.   Patented July 23, 1912.

Application filed September 13, 1911.   Serial No. 649,105.

*To all whom it may concern:*

Be it known that I, JOHN J. LAUER, a citizen of the United States, residing at Alturas, in the county of Modoc and State of California, have invented new and useful Improvements in Aeroplane Balancing and Controlling Means, of which the following is a specification.

This invention relates to aeroplane balancing and controlling means.

The object of the invention is to provide simple and effective gyroscopic mechanism for balancing, banking and steering the aeroplane, the action of which gyroscopic mechanism is placed within the complete control of the aviator.

The invention consists of the features of construction, combination and arrangement of parts, hereinafter fully described and claimed, reference being had to the accompanying drawing, in which:—

Figure 1 is a vertical fore-and-aft section through an aeroplane wing, showing the application of the invention. Fig. 2 is a vertical transverse section of the same. Fig. 3 is an enlarged central vertical transverse section through the gyroscope mechanism. Fig. 4 is a vertical fore-and-aft section of the same.

Referring to the drawings, A designates the gyroscope mechanism, comprising two gyroscope members 1 and 2, revoluble in opposite directions and driven by an electric motor 3 or other suitable means. The stator of the motor 3 is rigidly attached to the vertical shaft 4, and the gyroscopes revolve around this shaft as an axis of rotation. The shaft 4 is rigidly attached to a metal ring 5 having gear teeth 6, and meshing with these gear teeth 6 is a pinion 7 carried by a shaft 8, provided with a hand wheel or other adjusting device 9. The ring 5 is arranged vertically parallel to the line of flight and may be tilted in a fore and aft direction to correspondingly shift the shaft or axis 4. This position of the ring 5 is assumed merely to illustrate the action of the control mechanism, and is only one out of any number of positions in which said ring may be attached to the aeroplane and yet have the control mechanism equally effective. The ring 5 is fitted to turn within a groove in a central or intermediate ring 10, which is provided at its opposite sides with trunnions 11 and 12 to turn in bearings 13 in an outer or frame ring 14, all of which rings are arranged in concentric relation. The trunnion 11 is hollow and forms a bearing for the shaft 8, which extends therethrough, and said trunnion 11 is provided with a hand wheel or other adjusting device 15 by which the shaft or axis 4 may be shifted in either direction laterally. The frame-ring 14 is secured by brackets 16 to the aeroplane 17, at a point coinciding with the center of gravity of said aeroplane, so that when the gyroscopes are set in motion they will spin about the perpendicular axis $x$—$x$. This axis being considered as occupying a definite position in space, the gyroscope will tend to hold this axis in spite of all forces to the contrary. Turning the wheel 9 will have a tendency to longitudinally shift the axis of the gyroscope either clockwise or counter-clockwise about $y$—$y$ as a center. But since the gyroscope will not allow its axis of rotation to be shifted, the reaction will shift the ring 14 and, consequently, the aeroplane 17 attached to it, by which the wing will be tilted vertically, in a fore and aft direction upon its transverse axis, as indicated in dotted lines in Fig. 1. Turning the wheel 15 will have a tendency to shift the axis of the gyroscope in either direction transversely about $z$—$z$ as a center, resulting in the turning of the aeroplane on its longitudinal axis, as indicated in dotted lines in Fig. 2.

From the foregoing it can be readily seen that by adjusting both wheels 9 and 15 in conjunction with each other the wings of the aeroplane can be made to assume any angle whatsoever with relation to the axis of rotation of the gyroscope, but since the axis of rotation of the gyroscope can have no angular movement with reference to directions in space, then the wings of the aeroplane can be made to assume any angle whatsoever with reference to directions in space. These angular adjustments of the aeroplane wings can, therefore, be utilized for all necessary control operations for balancing, banking and steering. It will, of course, be understood that any suitable adjusting means may be employed in place of the hand wheels.

Having thus described the invention, what I claim as new is:

1. The combination, with an aeroplane, of an outer or frame ring fixed to the aeroplane, an intermediate ring mounted to tilt in said outer ring, an inner ring mounted to turn within the intermediate ring and provided with gear teeth, a shaft carried by the inner ring, a gyroscope mounted to revolve about said shaft, coaxially arranged adjusting devices, one of said devices being connected with the intermediate ring, and a gear upon the other adjusting device meshing with the gear teeth of the inner ring.

2. The combination, with an aeroplane, of a frame ring fixed to the aeroplane, an inner ring carrying a shaft or axis and provided with gear teeth, an intermediate ring pivoted to tilt within the outer ring and in which the inner ring is mounted for turning movement, oppositely revoluble gyroscopes mounted on said shaft or axis, and coaxially mounted adjusting devices, one of said devices being directly connected with the intermediate ring, and the other adjusting device carrying a pinion meshing with the gear teeth of the inner ring.

3. The combination, with an aeroplane, of a frame ring fixed to the aeroplane, an inner ring carrying a shaft or axis, one or more gyroscopes mounted to revolve about said axis, an intermediate ring supporting the inner ring and pivotally mounted to tilt upon the frame ring, means for tilting said intermediate ring, and means for turning the inner ring.

4. The combination, with an aeroplane, of an outer or frame ring fixed to the aeroplane, an inner ring carrying a shaft or axis, oppositely revoluble gyroscopes mounted on said shaft or axis, an intermediate ring supporting the inner ring and pivotally mounted upon the frame ring to tilt at an angle thereto, means for tilting said intermediate ring, and means for turning the inner ring.

5. The combination, with an aeroplane, of an outer or frame ring fixed to the aeroplane, inner and intermediate rings concentrically arranged with relation to each other and to said outer ring, said inner ring being circumferentially movable within the intermediate ring and the latter being pivotally mounted to tilt upon the outer ring, a shaft carried by the inner ring, one or more gyroscopes mounted upon said shaft, and devices for turning said inner ring and tilting said intermediate ring.

6. The combination, with an aeroplane, of an outer or frame ring fixed to the aeroplane, inner and intermediate rings concentrically arranged with relation to each other and to said outer ring, said inner ring being circumferentially movable within the intermediate ring and the latter being pivotally mounted to tilt upon the outer ring, a shaft carried by the inner ring, oppositely revoluble gyroscope members mounted on said shaft, and devices for turning said inner ring and tilting said intermediate ring.

In testimony whereof I affix my signature in presence of two witnesses.

JOHN J. LAUER.

Witnesses:
J. W. GIBBINS,
HARRY S. HAWKINS.